United States Patent
Shikano et al.

(10) Patent No.: US 7,808,541 B2
(45) Date of Patent: Oct. 5, 2010

(54) IMAGE PICKUP APPARATUS, IMAGE PICKUP LENS, AND DATA WRITING METHOD TO IMAGE PICKUP LENS

(75) Inventors: Shuji Shikano, Yaita (JP); Naohiro Tsuda, Saitama (JP); Tatsuo Seki, Saitama (JP); Yasuhiko Fukunaga, Saitama (JP); Tomoki Nishiyama, Saitama (JP); Makoto Toyota, Saitama (JP)

(73) Assignee: Moritex Corporation, Tokyo (JP)

( * ) Notice: Subject to any disclaimer, the term of this patent is extended or adjusted under 35 U.S.C. 154(b) by 958 days.

(21) Appl. No.: 10/597,250

(22) PCT Filed: Jan. 31, 2005

(86) PCT No.: PCT/JP2005/001326

§ 371 (c)(1),
(2), (4) Date: Dec. 20, 2006

(87) PCT Pub. No.: WO2005/074288

PCT Pub. Date: Aug. 11, 2005

(65) Prior Publication Data

US 2008/0218604 A1    Sep. 11, 2008

(30) Foreign Application Priority Data

Jan. 30, 2004    (JP) ............................... 2004/22622

(51) Int. Cl.
  *H04N 5/222* (2006.01)
(52) U.S. Cl. ................................. 348/333.12; 348/360
(58) Field of Classification Search ................ 348/360, 348/249.99–240.3, 333.01–333.04, 333.12
  See application file for complete search history.

(56) References Cited

U.S. PATENT DOCUMENTS 5,671,010 A * 9/1997 Shimbo et al. .............. 348/157

(Continued)

FOREIGN PATENT DOCUMENTS

JP    10-048532    2/1998

(Continued)

OTHER PUBLICATIONS

English Language Abstract of JP 10-048532.

(Continued)

*Primary Examiner*—Tuan Ho
(74) *Attorney, Agent, or Firm*—Greenblum & Bernstein P.L.C.

(57) ABSTRACT

To enable to display a scale indicative of a reference length on a screen of a display at an accurate length even when exchanging the lens in an image pickup apparatus to any lens.

In a case of mounting an exchange lens (4F, 4Z) to an image pickup apparatus main body (3) and displaying an image of an object picked up by an image sensor (2) and a scale (5) indicative of a reference length in juxtaposition on a screen of a display (6), a previously measured optical magnification or an actual magnification is outputted from optical magnification outputting means (8) provided to the exchange lens (4F, 4Z) is outputted, an actual magnification on the screen of the display (6) is calculated based on the optical magnification, the size for the image sensor and the screen size, and the size of the scale on the screen is set based on the actual magnification and the reference length of the scale by a scale setting means (17).

9 Claims, 3 Drawing Sheets

U.S. PATENT DOCUMENTS

2005/0157199 A1 * 7/2005 Aoki .......................... 348/360

FOREIGN PATENT DOCUMENTS

| JP | 10-210327 | 8/1998 |
| JP | 2000-155268 | 6/2000 |
| JP | 2001-174714 | 6/2001 |

OTHER PUBLICATIONS

English Language Abstract of JP 2001-174714.
English Language Abstract of JP 10-210327.
English Language Abstract of JP 2000-155268.

* cited by examiner

IMAGE PICKUP APPARATUS, IMAGE PICKUP LENS, AND DATA WRITING METHOD TO IMAGE PICKUP LENS

TECHNICAL FIELD

The present invention concerns a lens exchange type image pickup apparatus having an image processing apparatus of displaying an image of an object picked up by an image sensor and a scale indicative of a reference length in juxtaposition on a display screen, and an exchange lens used therefor.

BACKGROUND ART

In the image pickup apparatus, when an object is displayed on the screen of a display, a scale is displayed in juxtaposition on the screen such that the size of the object can be recognized easily.

In this case, when an optical magnification of a lens is constant, it may suffice to display a scale of a predetermined size but, in a case of using a variable magnification lens such as a zoom lens, it is also necessary to change the size of the scale in accordance with the magnification.

In such existent image pickup apparatus, it has been adapted to detect the position of a magnification adjusting movable lens and a varifocal movable lens used in a zoom lens, calculate the optical magnification of the lens based thereon, and set the size of the scale.

[Patent Document 1] JP-A No. 10-210327

However, in an image pickup apparatus of high magnification used as a microscope, since the focus is adjusted by relative movement of a stage in the direction of the optical axis, the lens has no varifocal movable lens and since the lens of high magnification has an extremely shallow depth of field and the object distance is primarily determined, so that it is not necessary to detect the same.

In view of the above, it has also been proposed an image pickup apparatus of reading a positional information of a lens based on output signals from a driving section for a magnification adjusting movable lens, calculating the magnification and setting the scale.

[Patent Document 2] JP-A No. 2000-155268

However, since a lens includes a magnification error of about 5% in a fixed focal length lens and about 10% in a zoom lens, in a case where it is intended to detect the magnification based on output signals from the driving section for the magnification adjusting movable lens, it inevitably contains an error of about 5 to 10%.

Further, since the positional information of the magnification adjusting movable lens is outputted from a zoom lens in any case and the magnification is detected based on the positional information in an image pickup apparatus main body, it is necessary to store data inherent to the lens necessary for converting the positional information into the magnification on the side of the image pickup apparatus.

In this case, since there is only one kind of data inherent to the zoom lens to be used in the existent image pickup apparatus not capable of lens exchange, it may suffice to merely store the data thereof.

However, in a case of using an image pickup apparatus as a microscope, it has been demanded that observation can be conducted under an appropriate magnification over a wide range of factor, for example, from several to several hundreds times depending on a body to be observed (object), and the range capable of controlling the enlarging magnification with only one zoom lens is restricted and the magnification can not be set freely.

Further, there is also a demand of using various kinds of lenses while exchanging them such that lenses of optional optical characteristics can be used selectively.

In this case, the demand can be satisfied by using an image pickup apparatus capable of lens exchange. However, since the data inherent to the lens are different in a case of calculating the magnification based on the positional information of the lens respectively upon exchange of lens, the enlarging magnification can not be calculated.

Further, in a case of a magnification fixed lens, since a magnification controlling variable lens is not present, the enlarging magnification can not be calculated based on the positional information.

Accordingly, it has been difficult to display a scale indicative of a reference length at an accurate length on a screen.

DISCLOSURE OF THE INVENTION

Subject to be Solved by the Invention

In view of the above, it is a technical subject of the invention for enabling to display a scale indicative of a reference length at an accurate length on the screen of a display even upon exchange to any lens.

Means for Solving the Subject

For solving the subject, an image pickup apparatus according to the present invention has a feature in a lens exchange type image pickup apparatus having an image processing apparatus of displaying an image of an object picked up by an image sensor and a scale indicative of a reference length in juxtaposition, in that an exchange lens mounted to an the image pickup apparatus main body has optical magnification outputting means for outputting a predetermined optical magnification, the image processing apparatus has actual magnification calculation means for calculating an actual magnification on a screen of a display based on the optical magnification, the size for the image sensor and the size of the screen and scale setting means of setting a scale based on the calculated actual magnification and the reference length of a scale to be displayed.

Further, an exchange lens for enlarged image pickup according to the invention is an exchange lens for enlarged image pickup mounted detachably to an image pickup apparatus main body having an image sensor, characterized by the provision of optical magnification outputting means of outputting a previously measured optical magnification.

EFFECT OF THE INVENTION

According to the image pickup apparatus of the invention, since an exchange lens mounted to the image pickup apparatus main body has the optical magnification outputting means as described in claim 1 and claim 4, and since the optical magnification previously set to each lens is outputted individually on every lens, an accurate optical magnification can be obtained even upon exchange of the lens.

Further, since an accurate optical magnification is measured on individual lens before shipping of the lens and the data is stored in a memory device as described in claim 2 and claim 5, the optical magnification of the exchanged lens can be outputted accurately with no error.

Then, an actual magnification on the screen of the display is calculated based on the magnification, and based on the size for the image sensor and the screen size, for example, by the following equation:

$$MR = MO \times D/d$$

in which
- MR: actual magnification
- MO: optical magnification of lens
- D: screen size on display
- d: size for image sensor Then, in a case of displaying the scale of a reference length S, the length L of the scale on the image is determined according to the following equation and a scale can be displayed at an accurate length on the screen of the display:

$$L = MR \times S$$

Further, in a case of a zoom lens where the exchange lens has a magnification adjusting movable lens, since a position sensor for detecting a movable lens position or a movable portion position corresponding thereto, and a memory device for storing a position-magnification conversion data of outputting an optical magnification in accordance with the detection position of the position sensor based on the previously measured optical magnification are provided as described in claim 3 and claim 6, when the optical magnification is controlled, an accurate optical magnification is outputted in accordance with the detection position of the position sensor, and the length of the scale can be accurately changed and displayed based thereon on real time.

BEST MODE FOR PRACTICING THE INVENTION

In this embodiment, a subject of enabling display for a scale indicative of a reference length on a screen of a display at an accurate length even upon lens exchange has been attained by outputting an optical magnification from the exchange lens.

FIG. 1 is an explanatory view showing a first embodiment of an image pickup apparatus according to the invention, FIG. 2 is an explanatory view showing a second embodiment, and FIG. 3 to FIG. 6 are flow charts showing data writing/reading procedures.

EMBODIMENT 1

An image pickup apparatus 1 of this embodiment includes an image pickup apparatus main body 3 having an image sensor 2, an exchange lens 4F, 4Z mounted exchangeably thereto, and an image processing apparatus 7 for displaying a scale 5 indicative of a reference length on a screen of a display 6 in juxtaposition together with an image of an object outputted from the image sensor 2.

The exchange lens 4F is a fixed magnification lens having an optical magnification outputting means 8 for outputting a previously set optical magnification MO.

The optical magnification outputting means 8 has a memory device 9 for storing a previously measured optical magnification MO. When lenses at a factor, for example, of 100× are designed and manufactured, an optical magnifications MO is accurately measured again on every individual lenses and when the measured optical magnification is 04.3×, 98.2×, etc., the value is stored in the memory device 9.

The exchange lens 4Z is a zoom lens using a magnification adjusting movable lens 10 and it has a position sensor 11 for detecting the position of the movable lens or a position of a movable portion corresponding thereto (rotational angle of a magnification controlling ring), and a memory device 12 for storing a position-magnification conversion data of outputting an optical magnification in accordance with the detection position of the position sensor 11 based on the previously measured optical magnification as the optical magnification outputting means 8.

In the exchange lens 4Z, since the magnification changes in accordance with the position of the movable lens 10, when zoom lenses capable of controlling the magnification, for example, from 30× to 100× are designed and manufactured, optical magnifications MOn and detection positions Pn outputted correspondingly from the position sensor 11 are measured at a plurality of measuring points while moving the movable lens 10 on every individual lenses 4Z, and position-magnification conversion data of converting the detection position into the optical magnification based on the detection position Pn and the optical magnification MOn are stored in the memory device 12.

The position-magnification conversion data uses, for example, a table formed by plotting measuring points on a graph expressing the detection position Pn on the axis X and the optical magnification MOn on the axis Y and preparing a graph connecting them with an approximate line into data.

Then, on every movement of the movable lens 10, the detection position is outputted from the position sensor 11 and an optical magnification is outputted in accordance with the detection position.

The image processing apparatus 7 has an image generating section 13 for generating an image from an image data for an object outputted from the image sensor 2 of the image pickup apparatus main body 3, a scale generating section 14 for generating a scale 5 based on the optical magnification outputted from the exchange lenses 4F, 4Z, and a display image outputting section 15 for displaying the image generated by the image generating section 13 and the scale 5 set by the scale generating section 14 in juxtaposition on the screen of the display 6.

The image processing apparatus 7 is not restricted only to a machine used exclusively herein to which the image pickup apparatus main body 3, the exchange lens 4F, 4Z, and the display 6 are connected, but it may be a general-purpose machine such as a personal computer, or it may be assembled into the image pickup apparatus main body 3.

The scale generating section 14 has an actual magnification calculation means 16 for calculating an actual magnification MR on the screen of the display 6 and a scale setting means 17 for deciding the length on the screen of the scale 5 indicative of the reference length.

The actual magnification calculation means 16 calculates the actual magnification MR on the screen of the display 6 according to the following equation based on the optical magnification MO outputted from the exchange lenses 4F, 42, the previously set size d for the image sensor 2, and the screen size D of the display 6 to be used:

$$MR = MO \times D/d$$

The size d for the image sensor 2 and the screen size D are that for the corresponding portion and, for example, in a case where the lateral width of the image sensor 2 and the lateral width of the image screen of the display 6 are corresponded, they are the lateral width thereof.

Further, the actual magnification calculating means 16 outputs a character data for the actual magnification MR to the display image outputting section 15 so that numerical value for the actual magnification MR can be displayed on the screen.

In this case, since the size d for the image sensor 2 and the screen size D of the display 6 to be used are known, when the values are previously inputted, the actual magnification MR can be determined only the optical magnification MO outputted from the exchange lens 4F, 4Z being as the variant.

For example, in a case where the size for the image sensor 2 is: d=8 mm and the screen size of the display 6 is: D=356 mm, the actual magnification MR of the image pickup apparatus 1 is represented as:

$$MR=MO\times 356/8=44.5\times MO$$

In a case where the optical magnification outputted from the exchange lens 4F, 4Z is: MO=2.2×, the actual magnification MR of an object displayed on the display 6 is:

$$MR=2.2\times 44.5=97.9$$

and the character data is "×97.9".

Further, in the scale setting means 17, when a reference length S of the scale 5 to be displayed is inputted, the length L of the scale 5 on the screen is calculated according to the following equation:

$$L=MR\times S$$

For example, in a case of intending to display the scale 5 indicative of the reference length: S=1 mm, the length L thereof on the screen is:

$$L=97.9\times 1 \text{ mm}=97.9 \text{ mm}$$

Then, the length 97.9 mm is converted into the number of pixels, and the image data for the scale 5 of a length corresponding to the number of the pixels and the character data indicating the size of the reference length S (for example "1 mm") is outputted to the display image outputting section 15.

Thus, image data containing the image of an object picked up by the image sensor 2, the scale 5 indicative of the reference length S, a character data for "1 mm" indicating the size of the scale 5 and the character data: "×97.9" showing the actual magnification are outputted and displayed on the screen of the display 6.

A constitutional example of the invention is as has been described above and the operation thereof is to be described.

At first, upon manufacturing the exchange lenses 4F, 4Z, optical magnification is accurately measured on every individual lens. In the fixed magnification exchange lens 4F, the optical magnification thereof is stored in the memory device 9. In the valuable magnification exchange lens 4Z, optical magnification MOn and detection position Pn are measured at a plurality of measuring points while moving the movable lens 10, and the data of a graph formed by connecting the measuring points with an approximate line based thereon is stored as the position-magnification conversion data in the memory device 12.

Then, an optional exchange lens 4F, 4Z is mounted to the image pickup apparatus main body 3 and, when an object is picked up, an image taken by the image sensor is outputted by way of the image generating section 13 of the image processing apparatus 7 to the display image outputting section 15.

In this case, when a fixed magnification exchange lens 4F is mounted, the optical magnification MO of the lens 4F is outputted from the memory device 9 of the optical magnification outputting means 8 and inputted to the scale generating section 14 of the image processing apparatus 7.

In the scale generating section 14, an actual magnification MR on the screen of the display 6 is calculated based on the optical magnification MO, the size d for the image sensor 2, and the screen size D of the display 6 by the actual magnification calculation means 16, the length L of the scale S on the screen is set based on the actual magnification MR and the reference length S by the scale setting means 17, and the image data for the scale 5 and the character data for the reference length S are outputted to the display image outputting section 15.

As a result, an image data for the object, an image data for the scale 5, a character data for the reference length S, and a numeral data for the actual magnification MR are outputted from the display image outputting section 15 to the display 6 and displayed on the screen.

Further, in a case where a magnification variable exchange lens 4Z is mounted, the position for the magnification adjusting movable lens 10 is detected by the position sensor 11 on every movement, and the optical magnification is inputted based on the detection position by way of the position-magnification converter 12 to the scale generating section 14 of the image processing apparatus 7.

Then, in the same manner as described above, the data for the scale 5 indicative of the reference length S is outputted to the display image outputting section 15.

As a result, an image data for the object, an image data for the scale 5, a character data for the reference length S, and a numerical data for the actual magnification MR are outputted from the display image outputting section 15 to the display 6 and displayed on the screen thereof and, since the optical magnification MO of the exchange lens 4Z is outputted and the actual magnification MR is calculated, on every control for the magnification, the length of the scale 5 displayed on the screen and the actual magnification MR are changed on real time.

As has been described above according to the invention, upon exchange to an optional exchange lens 4F, 4Z, since the previously measured accurate optical magnification of the lens is outputted from the lens and the scale is set at the actual magnification calculated based thereon, it provides an excellent effect capable of displaying the scale 5 indicative of the reference length S at an accurate length on the screen of the display 6.

EMBODIMENT 2

In the image pickup apparatus shown in FIG. 2, an image pickup lens 24 capable of controlling the magnification is mounted to an image pickup apparatus main body 23 having an image sensor 22, and an image processing apparatus 27 intended to display an image of an object picked up by the image sensor 22 and a scale 25 indicative of a reference length in juxtaposition on a display 26 of a predetermined image screen size is provided.

The image pickup lens 24 has a position sensor 29 for detecting the position of a magnification adjusting movable lens 28 or a position of a movable portion corresponding thereto, and carries a microcomputer 30 for outputting an optical magnification MO corresponding to the detection position by the position sensor 29 and a nominal magnification MN.

Further, a zoom ring 31 for operating the magnification adjusting movable lens 28 has a click mechanism to be stopped at a position for a scale marking value for actual magnification MR attached to a zoom indicator 32. For example, in a case of using a display of an assumed screen size and in a case where the actual magnification MR changes from 10× to 50×, a scale marking values N for 10×, 20×, 30×, 40× and 50× are attached to the zoom indicator 32, and the zoom ring 31 is clicked to stop at the scale position.

The microcomputer 30 has a data memory 33 for storing a magnification data corresponding to the detection position and a program memory 34 for storing a program for reading/writing the data.

The data memory 33 records a position-magnification conversion table 35 recording an optical magnification MO corresponding to the previously measured detection position of the position sensor 29, and has a nominal magnification outputting means 36 of outputting a nominal magnification MN to be displayed on the display.

In the position-magnification conversion table 35, an optical magnification is recorded corresponding to the position data for the detection position outputted from the position sensor 29 upon measurement of the optical magnification, and a positional data is set corresponding to the click position.

Accordingly, while the optical magnification is outputted in accordance with the position data outputted from the position sensor 29, the detection value may sometimes vary between the case of operating the zoom ring 31 from a lower magnification side to a higher magnification side and a case of operation from the higher magnification side to the lower magnification side due to backrush of the position sensor 29, etc. and, particularly, the length of the scale 25 changes irrespective of alignment of the zoom ring 31 to an identical click position.

Therefore, in this embodiment, in a case where the detection position outputted from the position sensor 29 is within a predetermined range of error previously set around the click position to be stopped by the click mechanism, not an optical magnification corresponding to each of the positional data but an optical magnification data corresponding to the positional data set as the click position is outputted compulsorily.

Further, due to the individual difference of individual lens magnifications used for the image pickup lens 24 or the mechanical error of the zoom mechanism, even when it is aligned with a predetermined click position (for example 20×), the actual magnification MR upon control can scarcely be 20× accurately.

Further, upon picking up an image of the object, it may suffice that the actual magnification MR is reflected on the length of the scale 25 and, as a magnification value to be indicated on the image screen, a nominal magnification representing an approximate image pickup magnification is rather used generally.

Then, the nominal magnification outputting means 36 is adapted to output a nominal magnification data MN corresponding to a scale marking value N indicated on the zoom indicator 32 when the detection position outputted from the position sensor 29 is within a predetermined range of error previously set around the scale position stopped by the click mechanism as a center.

Further, the image processing apparatus 27 has an image generating section 37 for generating an image from the image data for an object outputted from the image sensor 22 of the image pickup apparatus main body 23, a scale generating section 38 for setting a scale based on the optical magnification Mo outputted from the microcomputer 30 of the image pickup lens 24 and the reference length S of the scale 25 to be indicated, and a display image outputting section 39 for generating an image to be displayed on the display 26.

The display image outputting section 39 generates images for displaying the scale 25 set by the scale generating section 38 and the value for the nominal magnification MN when the nominal magnification MN is outputted from the microcomputer 30 of the image pickup lens 24 being juxtaposed with the image generated by the image generating section 37.

The image processing apparatus 7 is not restricted only to a machine used exclusively herein to which the image pickup apparatus main body 23, the image pickup lens 24, and the display 26 are connected, but it may be a general-purpose machine such as a personal computer, or it may be assembled into the image pickup apparatus main body 23.

The scale generating section 38 has an actual magnification calculation means 40 for calculating an actual magnification MR on the screen of the display 26 and a scale setting means 41 for deciding the length on the screen of the scale 5 indicative of the reference length.

The actual magnification calculation means 40 calculates the actual magnification MR on the screen of the display 26 based on the optical magnification MO outputted from the image pickup lens 24, the previously set size d for the image sensor 22, and the screen size D of the display 26 to be used according to the following equation:

$$MR = MO \times D/d$$

The size d for the image sensor 22 and the screen size D are those for the corresponding portion and, for example, in a case where the lateral width of the image sensor 22 and the lateral width of the image screen of the display 26 are corresponded, they are the lateral width thereof.

Further, the actual magnification calculating means 40 outputs a character data for the actual magnification MR to the display image outputting section 39 so that a numerical value for the actual magnification MR can be displayed on the screen.

In a case of writing/reading position-magnification data to the data memory 33, a program capable of inputting/outputting the data is stored in the program memory 34 of the microcomputer 30, the position data for the magnification adjusting movable lens 28 is outputted upon measurement of the optical magnification by using the program in the prior art, the position-magnification data is measured which is then written in the data memory 33, and the actual magnification can be outputted based on the position data upon image pickup.

However, a problem has occurred in this case that the data written in the data memory 33 should be lost or the program runs uncontrollably to overwrite random numerical value data when an excess current flows temporarily by connection/disconnection of a connector, or like other external disturbance.

In view of the above, in this embodiment, position-magnification data is written/read by the following procedures so as not to cause such troubles.

FIG. 3 is an explanatory view showing the procedure. At step STP1, a positional data output program PRG1 only for outputting the position data of the magnification adjusting movable lens 28 detected by the position sensor 29 is stored in the program memory 34, and the position data is outputted successively upon measurement of the optical magnification.

Then, at step STP2, a read/write program PRG2 capable of writing/reading the measured optical magnification and the position data is written over the program memory 34 and the position data and the magnification data are written to the position-magnification conversion table 35 of the data memory 33.

At step STP3, a read only program PRG3 capable of reading the magnification data corresponding to the position data of the position-magnification conversion table 35 recorded in the data memory 33 and not having data writing means to the data memory 33 is written over the program memory 34, so that optical magnification data can be outputted upon image pickup.

FIG. 4 shows a concrete procedure of the position data outputting program PRG1 used upon measurement of the optical magnification. At step STP11, an output signal from the position sensor 29 is put to A/D conversion, which is outputted as a position data at step STP12 and then it returns to step STP11.

According to the procedure, on every movement of the magnification adjusting movable lens 28 by the operation to the zoom ring 31, the position is detected by the position sensor 29 and the position data PSDn is outputted.

Accordingly, when a scale, for example, is picked up, the optical magnification is calculated based on the actual length thereof, the length of the scale transferred to the display 26, and the size of the image sensor 22 and the display 6, and then an optical magnification data MODn corresponding to the position data PSDn may be determined successively.

FIG. 5 shows a specific example of a read/write program PRG2 used for data writing. At step STP21, on every data input from a personal computer, etc. storing the previously measured position-magnification data, the data is written at a predetermined address in the position-magnification conversion table 35 and then it goes to step STP22 at the instance the data writing has been completed.

The step STP22 is for confirmation that the optical magnification data has been outputted properly or not based on the position data when the position data is outputted from the position sensor 29. The value of the optical magnification data corresponding to the positional data is outputted when the same has been recorded whereas, in a case where the data has not been recorded, a value calculated from the optical magnification data corresponding to two position data before and after the same is outputted.

FIG. 6 shows a specific example of a read only program PRG3 used for image pickup. At step STP31, an optical magnification data is outputted based on the positional data outputted from the position sensor 29. In a case where an optical magnification data corresponding to the position data is recorded, the value is outputted and in a case where it is not recorded a value is calculated from the optical magnification data corresponding to two position data before and after thereof and outputted.

Since the program PRG3 has no data writing command, it does not re-write the content of the data memory 33 even how the program runs uncontrollably.

An constitutional example of this embodiment has been described above and the operation thereof is to be described.

At first, when the optical magnification of the valuable magnification image pickup lens 24 is measured, the position data outputting program PRG1 is written in the program memory 34 and, based on the optical magnification MRn and the detection position Pn measured at a plurality of measuring points while moving the magnification adjusting movable lens 28, the position-magnification conversion data is prepared based on the data for the measuring points.

Then, when a data is written in the position-magnification conversion table 35 of the data memory 33, the position data outputting program PRG1 is eliminated by writing the read/write program PRG2 over the program memory 34 and, when the previously prepared position-magnification conversion data is inputted from the personal computer or the like, data is written in the position-magnification conversion table 35 by the read/write program PRG2.

When the zoom ring 31 is operated in this state, the position of the magnification adjusting movable lens 28 is detected by the position sensor 29, and an optical magnification MO corresponding to the position data PSD is outputted with reference to the position-magnification conversion table 35, to display the scale 25 of the reference length S on the display 26 by the image processing apparatus 27.

Accordingly, in a case where an image of an object attached with a scale identical with the reference length S is picked up, when the length of the scale 25 is indicated on the display 26 so as to align with the scale pitch of the object upon changing the magnification, it can be confirmed that data has been inputted correctly.

After completion of the confirming operation, the read/write program PRG2 is eliminated by overwriting the read only program PRG3 on the program memory 34.

Then, when the image of an object is picked up, the image taken into the image sensor 22 is outputted by way of the image generating section 37 of the image processing apparatus 27 on the display image outputting section 39.

Then, when the zoom ring 31 is operated, the position of the magnification adjusting movable lens 28 is detected by the position sensor 29, an actual magnification MR corresponding to the position data PSD is inputted to the scale setter 38 of the image processing apparatus 27 with reference to the position-magnification conversion table 35, and the data for the scale 35 indicative of the reference length S is outputted to the display image outputting section 39.

Further, when the zoom ring 31 is clicked to stop at the position for the scale marking value N attached to the zoom indicator 32 (for example, 10×, 20×, 30×, 40×, and 50×), a nominal magnification data MN corresponding to the scale marking value N indicated on the zoom indicator 32 is always outputted even in a case where the position sensor 29 includes backrush.

Thus, when the zoom ring 31 is clicked to stop, the scale marking value N can always be indicated as the nominal magnification MN.

Further, in the same manner, when the zoom ring 31 is clicked to stop, since an optical magnification data corresponding to the position data set as the click position is outputted compulsorily, a predetermined optical magnification MO is always outputted at the click position, which does not fluctuate by the effect of the backrush, etc.

As a result, the image data for the object, the image data for the scale 25, the character data for the reference length S and, optionally, a numerical data for the nominal magnification MN are outputted by the display image outputting section 39 to the display 26 and displayed on the screen.

Then, since the optical magnification MO is updated on every control for magnification, the actual magnification MR also changes, and the length of the scale 25 indicated on the screen is also changed according to the control for the magnification on real time.

As has been described above, in a case of using the image pickup lens 24 of this embodiment, since the optical magnification MO under current image pickup is outputted on real time and, when the zoom ring 31 is clicked to stop, the nominal magnification therefor is outputted, the scale 25 indicative of the reference length S on the screen of the display 26 can be displayed at an accurate length upon exchange to any lens and, further, a nominal magnification upon alignment to the click position can also be displayed.

Further, since the program written in the microcomputer 30 of the image pickup lens 24 upon image pickup is the read only program PRG 3 and has no data writing command, even when the program PRG3 runs uncontrollably, data in the data memory 33 is not lost, or random numerical data is not overwritten.

INDUSTRIAL APPLICABILITY

As has been described above, according to the present invention, since the scale indicative of the reference length S can be displayed at an accurate length irrespective of the kind of the image pickup lens, it is suitable to the application use for a lens exchange type image pickup apparatus used, for example, in a microscope.

Figure 1:
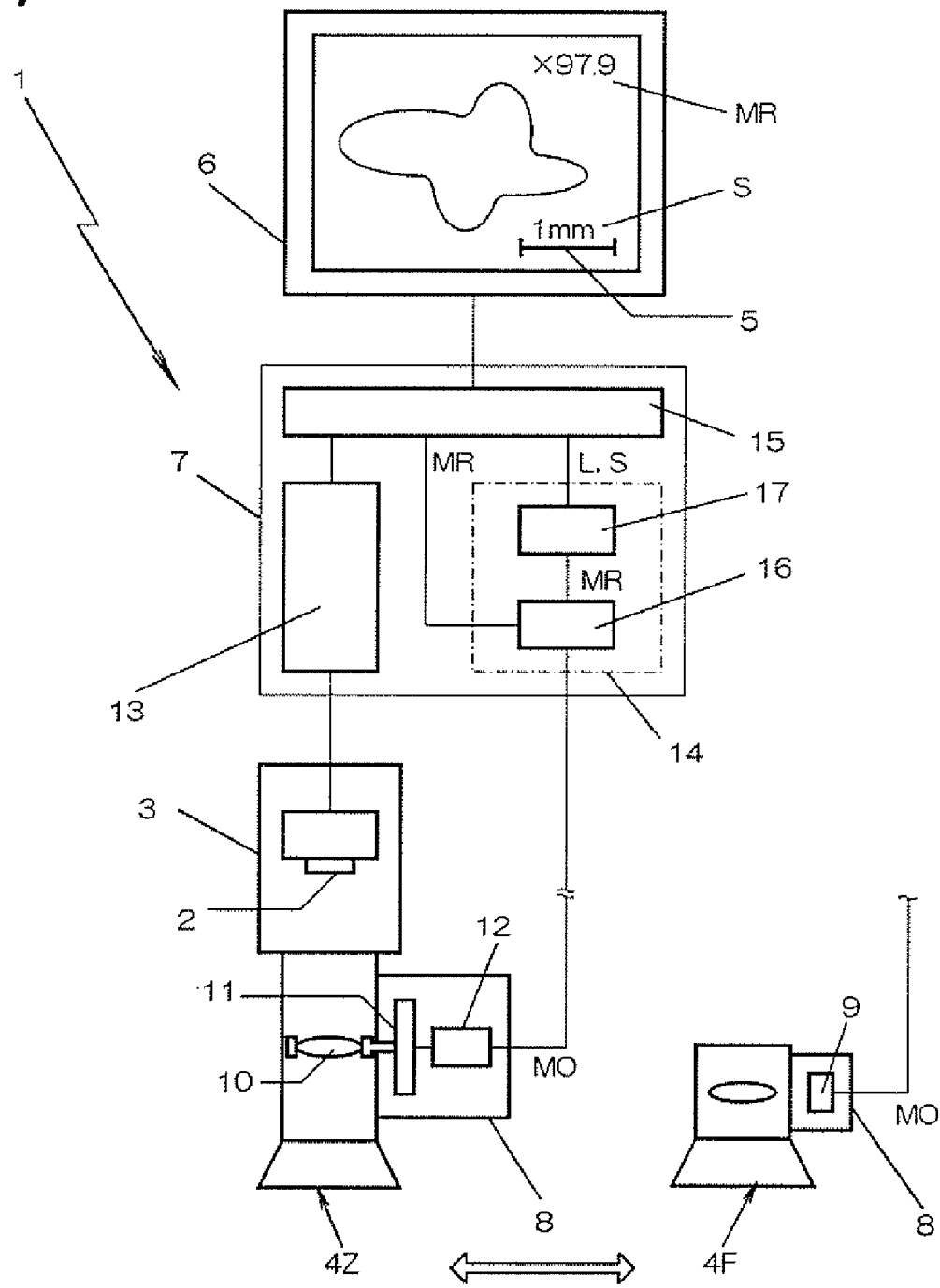
FIG. 1 is an explanatory view showing a first embodiment of an image pickup apparatus according to the present invention
Figure 2:
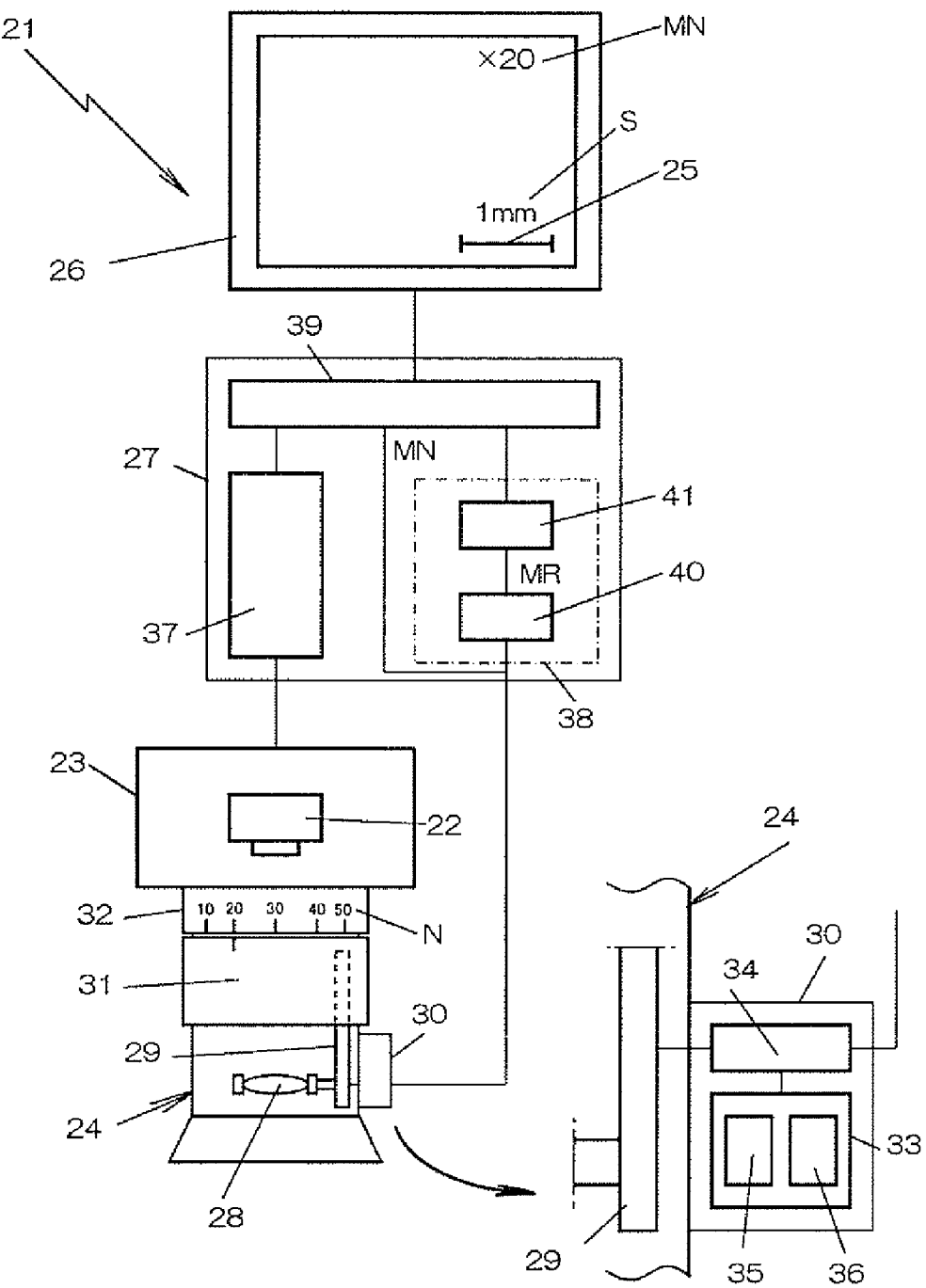
FIG. 2 is an explanatory view showing a second embodiment.
Figure 3:
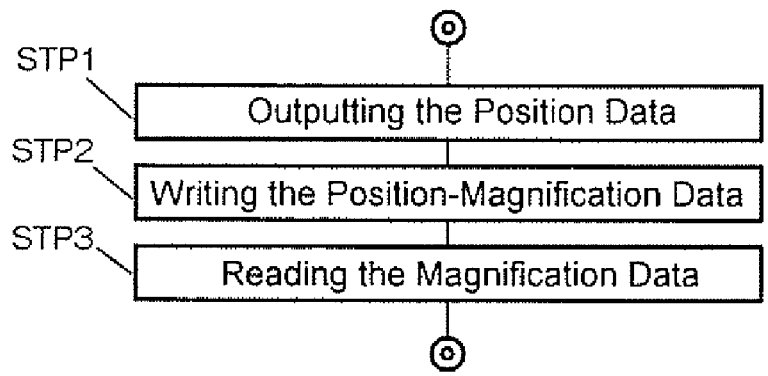
FIG. 3 is a flow chart showing a data writing/reading procedure.
Figure 4:
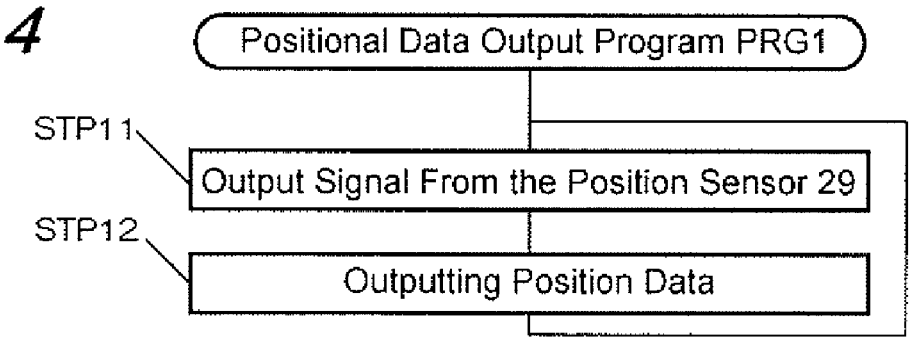
FIG. 4 is a flow chart for a position data outputting program.
Figure 5:
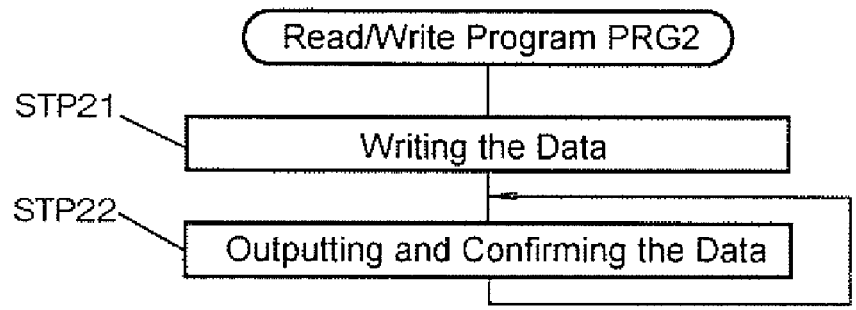
FIG. 5 is a flow chart for a read/write program.
Figure 6:
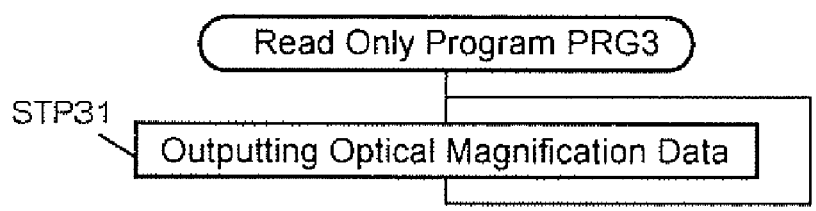
FIG. 6 is a flow chart of a read only program.

DESCRIPTION OF REFERENCES 1 image pickup apparatus
2 image sensor
3 image pickup apparatus main body
4F, 4Z exchange lens
5 scale
6 display
7 image processing apparatus
8 optical magnification outputting means
9 memory device
10 magnification adjusting movable lens
11 position sensor
12 position-magnification converter
16 actual magnification calculation means
17 scale setting means
21 image pickup apparatus
22 image sensor
23 image pickup apparatus main body
24 image pickup lens
25 scale
26 display
27 image processing apparatus
28 magnification adjusting movable lens
29 position sensor
30 microcomputer

The invention claimed is:

1. A lens exchange type image pickup apparatus having an image processing apparatus of displaying an image of an object picked up by an image sensor and a scale indicative of a reference length in juxtaposition on an image screen of a display, in which
an image pickup lens mounted to an image pickup apparatus main body has optical magnification outputting means for outputting a predetermined optical magnification, and
the image processing apparatus includes an actual magnification calculation means for calculating an actual magnification on the screen of a display based on the optical magnification, the size for the image sensor, and the size of the image screen, and scale setting means for setting a scale based on the calculated actual magnification and the reference length of the scale to be displayed.

2. An image pickup apparatus according to claim 1, wherein the optical magnification outputting means has a memory device for storing a previously measured optical magnification.

3. An image pickup apparatus according to claim 1, wherein the image pickup lens, in a case where it is a zoom lens having a magnification adjusting movable lens, has a position sensor for detecting the position of the movable lens or the position of a movable portion corresponding thereto, and the optical magnification outputting means has a memory device for storing a position-magnification conversion data for outputting an optical magnification in accordance with the detection position of the position sensor based on the previously measured optical magnification.

4. An image pickup lens mounted detachably to an image pickup apparatus main body having an image sensor, and including optical magnification outputting means for outputting a previously measured optical magnification.

5. An image pickup lens according to claim 4, wherein the optical magnification outputting means has a memory device for storing a previously measured optical magnification.

6. An image pickup lens according to claim 4, having a magnification adjusting movable lens for changing the optical magnification and a position sensor for detecting a position of the movable lens or a position of a movable portion corresponding thereto, in which the optical magnification outputting means has a memory device for storing a position-magnification conversion data for outputting an optical magnification in accordance with the detection position of the position sensor based on the previously measured optical magnification.

7. An image pickup apparatus having an image processing apparatus intended for displaying an image of an object picked up by an image sensor through a magnification controllable image pickup lens and a scale indicative of a reference length in juxtaposition on a display of a predetermined screen size, in which
the image pickup lens has a position sensor for detecting a position of a magnification adjusting movable lens or a position of a movable portion corresponding thereto, and a microcomputer for outputting an optical magnification and a nominal magnification corresponding to the detection position of the position sensor based on the predetermined position-magnification conversion table, and
the image processing apparatus has a scale setter for setting the scale based on an actual magnification and a reference length of the scale to be indicated.

8. An image pickup lens mounted to an image pickup apparatus main body intended to display image of an object picked up by an image sensor and a scale indicative of a reference length in juxtaposition on a display of a predetermined screen size, including
a zoom ring for operating the magnification adjusting movable lens, a click mechanism to stop at a position for the scale marking number of a nominal magnification corresponding to an actual magnification attached to a zoom indicator, a position sensor for detecting a position of a magnification adjusting movable lens or a portion of a movable position corresponding thereto, and a microcomputer for outputting an optical magnification and a nominal magnification corresponding to the detection position of the position sensor based on the previously set position-magnification conversion table, in which
a nominal magnification data corresponding to a scale marking value indicated to the zoom indicator is outputted in a case where the detection position outputted from the position sensor is within a predetermined range of error previously set around the click position stopped at the click mechanism as a center.

9. An image pickup lens according to claim 8, wherein an optical magnification data corresponding to a position data set as a click position is outputted in a case where a detection position outputted from the position sensor is within a predetermined range of error previously set around the click position stopped by the click mechanism as a center.

* * * * *